Nov. 27, 1934.  L. PIERCE  1,982,320
CONTROL APPARATUS FOR WASHING AND CLEANSING MACHINES
Filed March 23, 1933  10 Sheets-Sheet 1
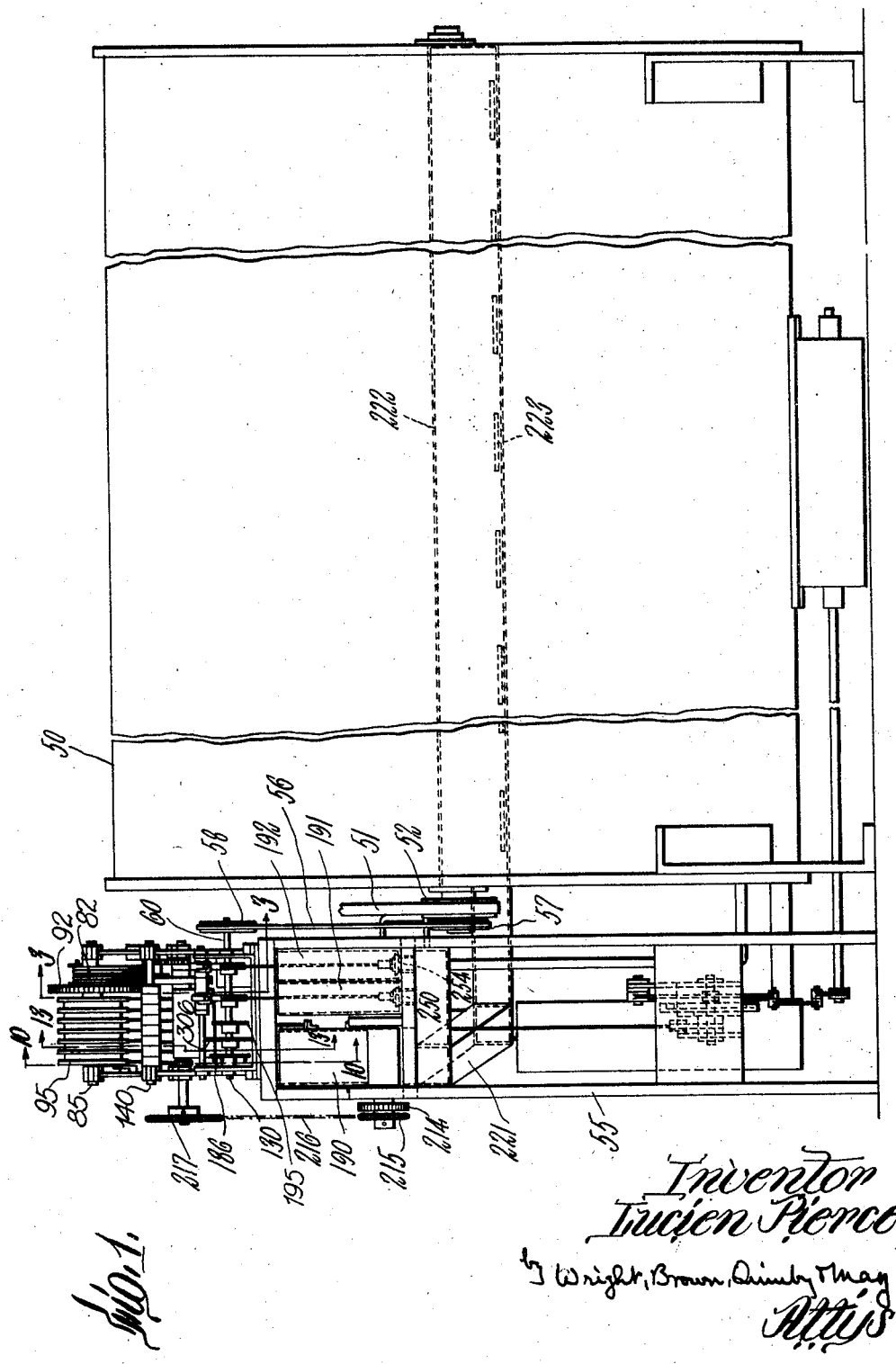

Nov. 27, 1934.                L. PIERCE                1,982,320
CONTROL APPARATUS FOR WASHING AND CLEANSING MACHINES
Filed March 23, 1933        10 Sheets-Sheet 2
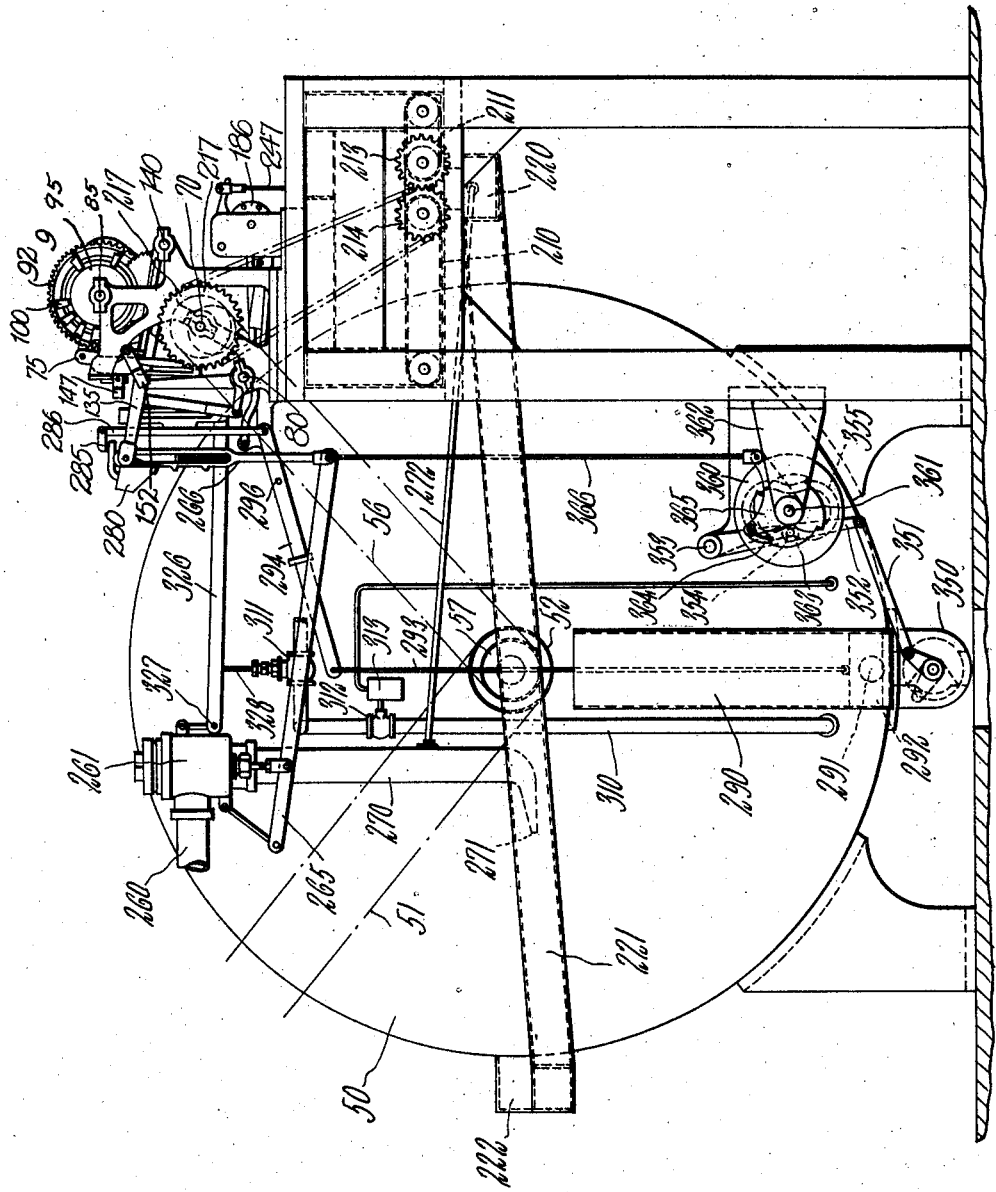

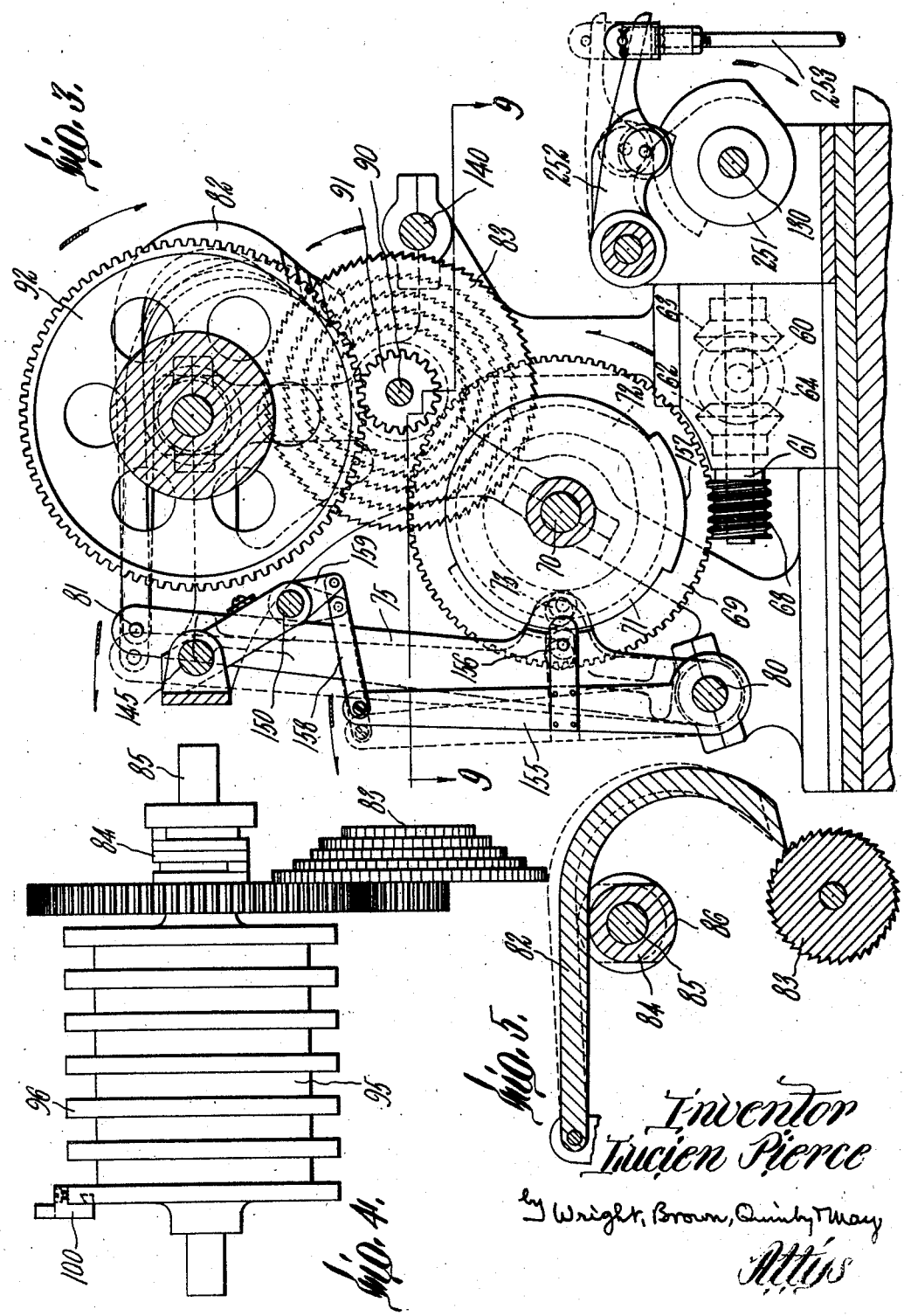

Nov. 27, 1934.    L. PIERCE    1,982,320
CONTROL APPARATUS FOR WASHING AND CLEANSING MACHINES
Filed March 23, 1933    10 Sheets-Sheet 4
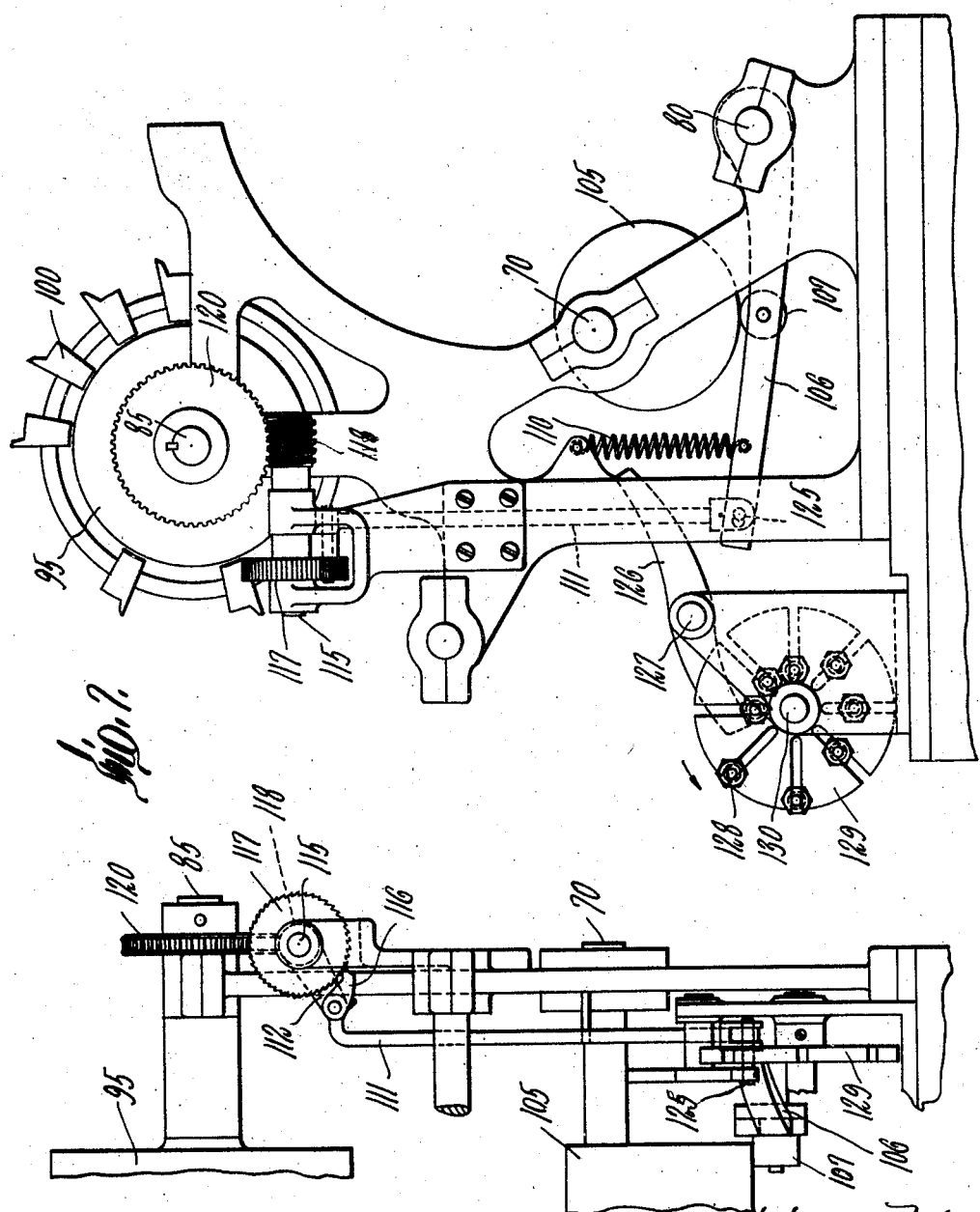

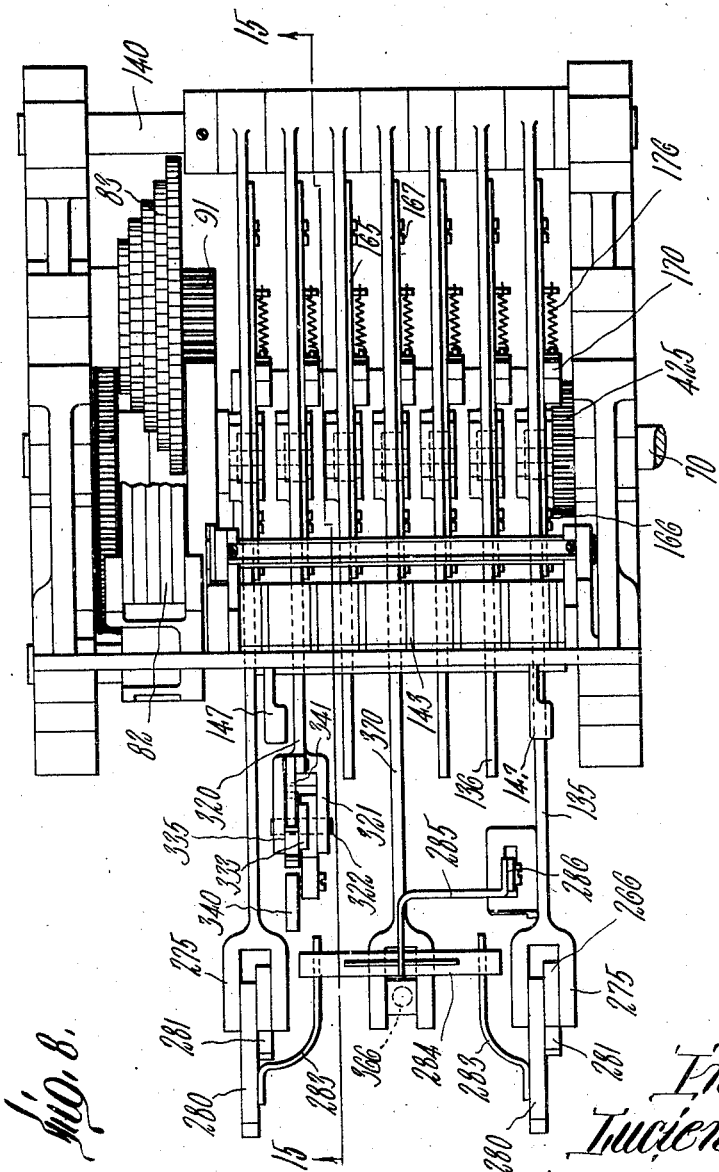

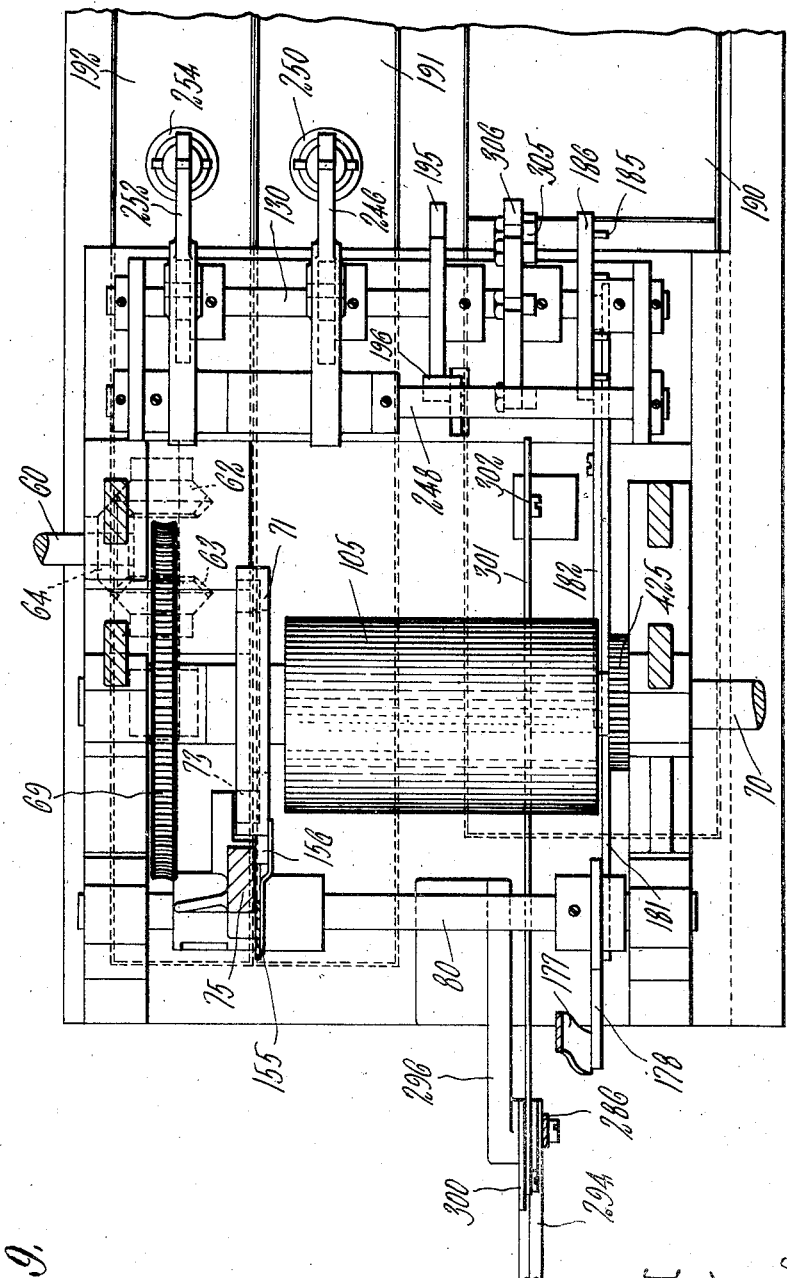

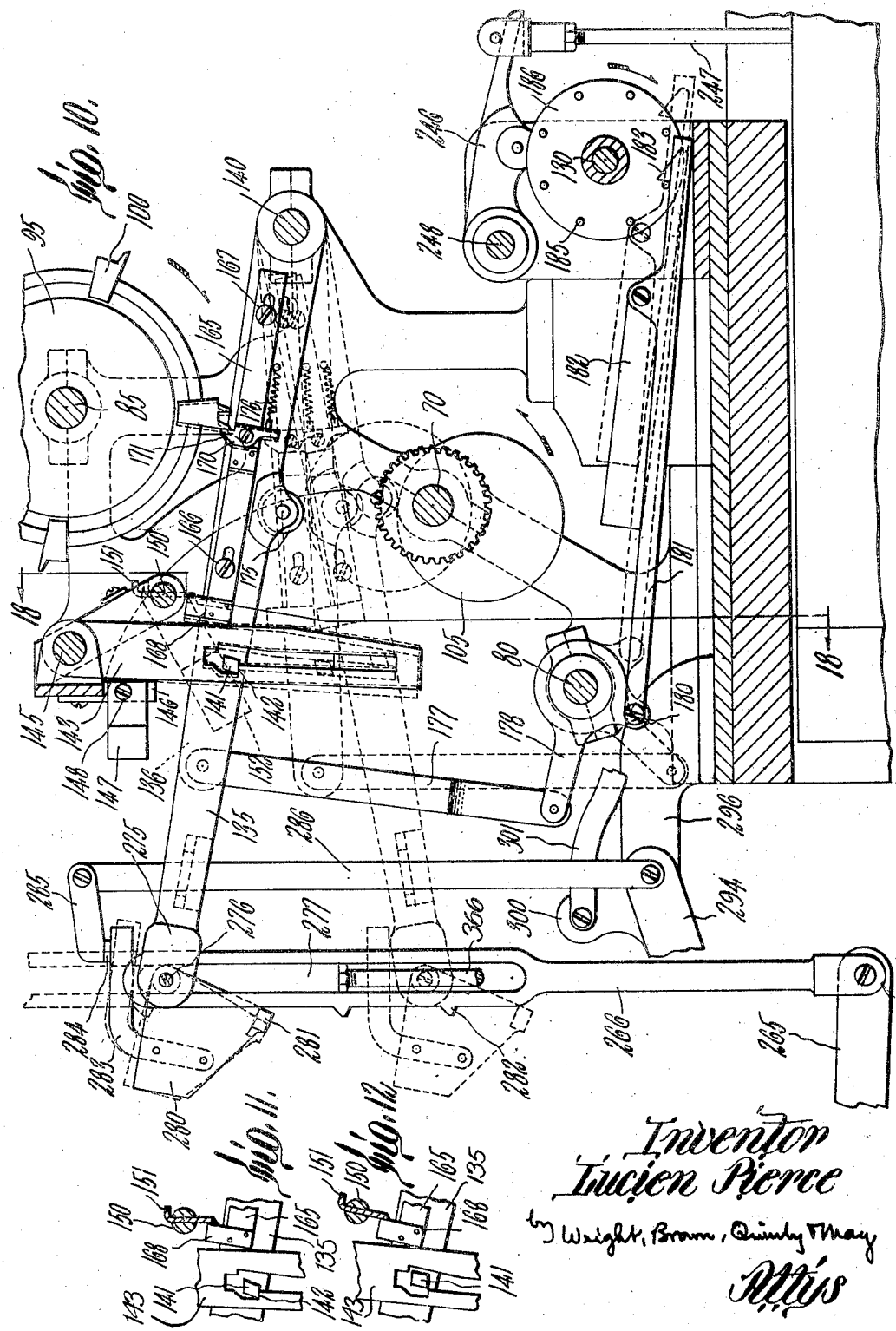

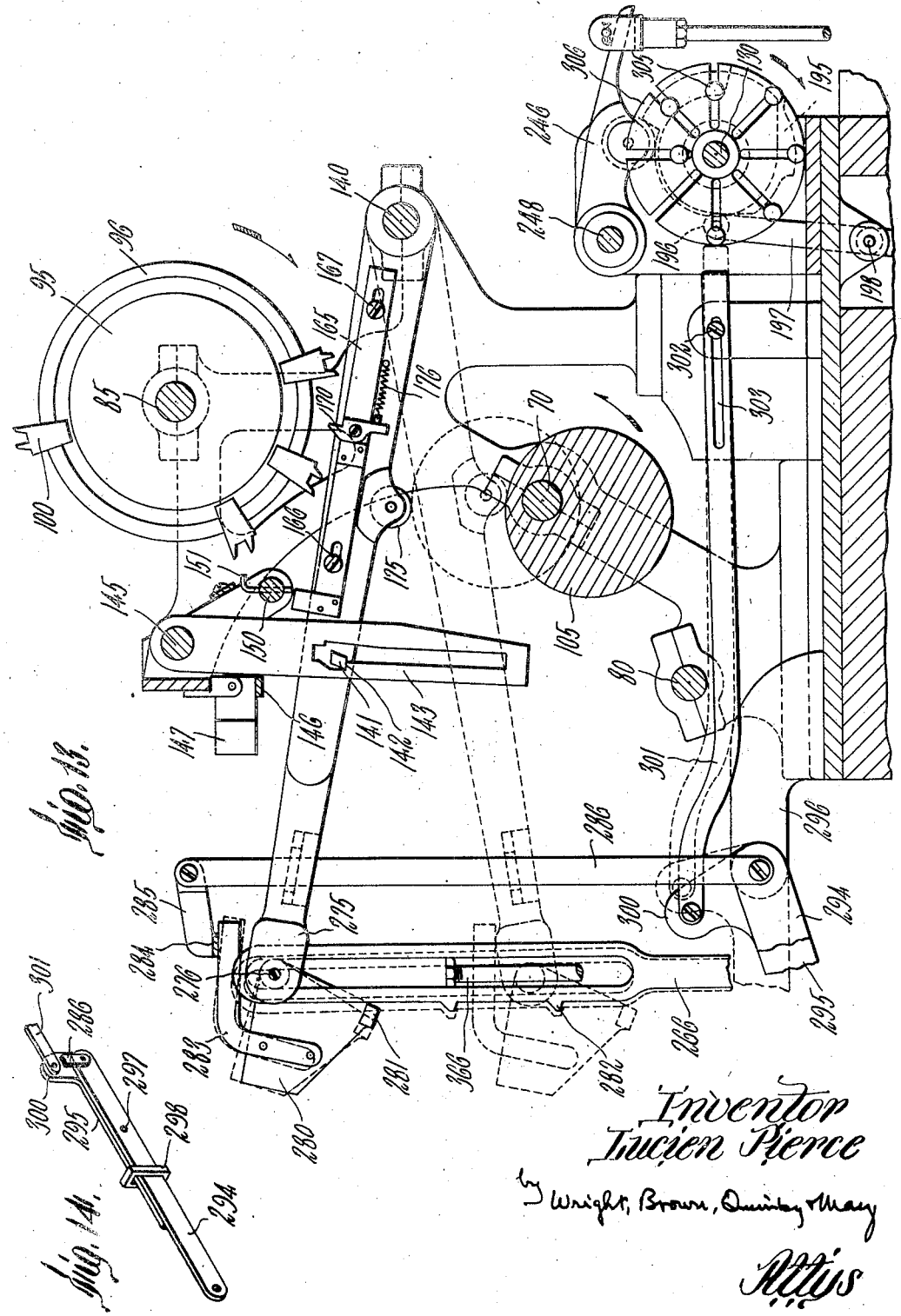

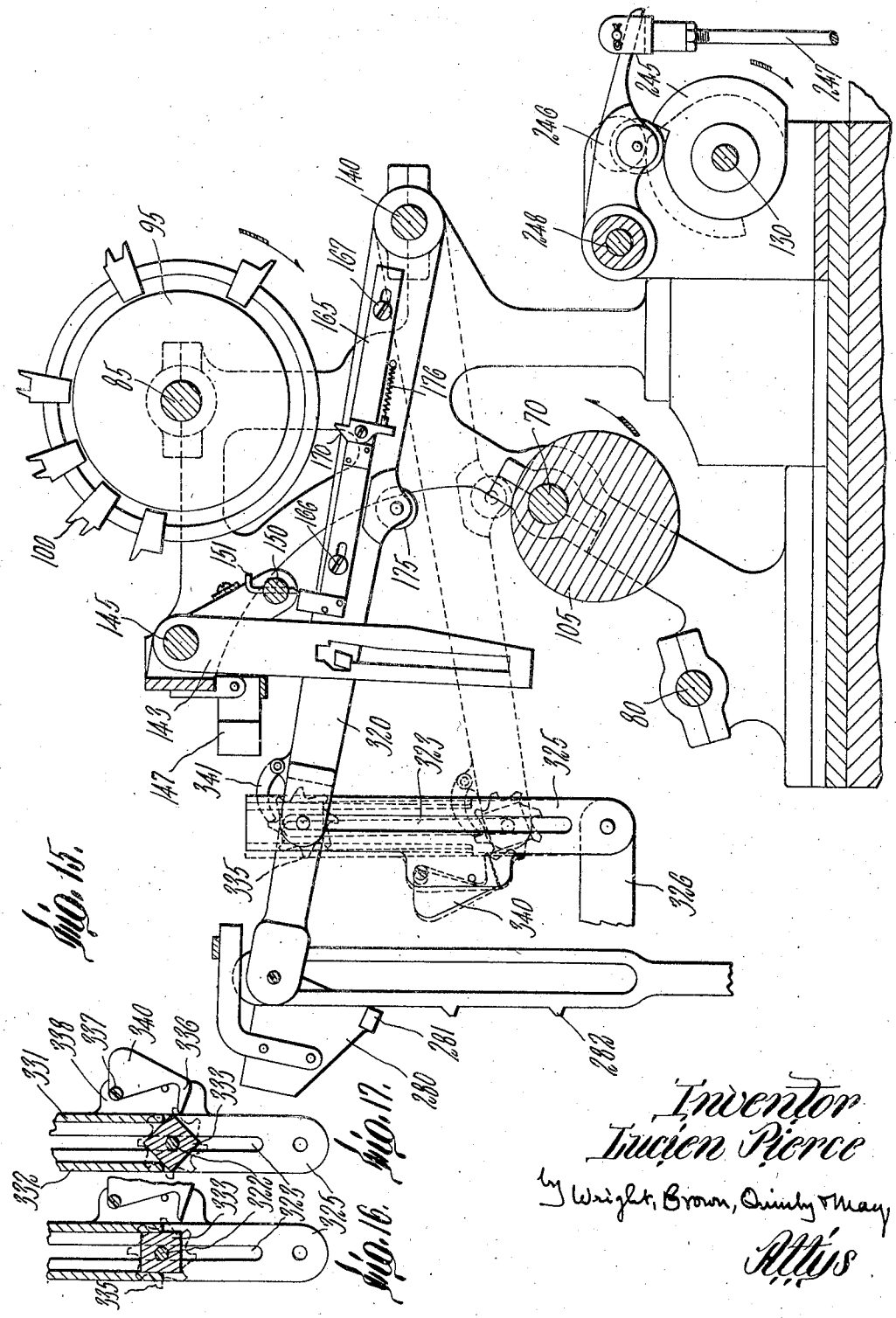

Nov. 27, 1934.　　　L. PIERCE　　　1,982,320
CONTROL APPARATUS FOR WASHING AND CLEANSING MACHINES
Filed March 23, 1933
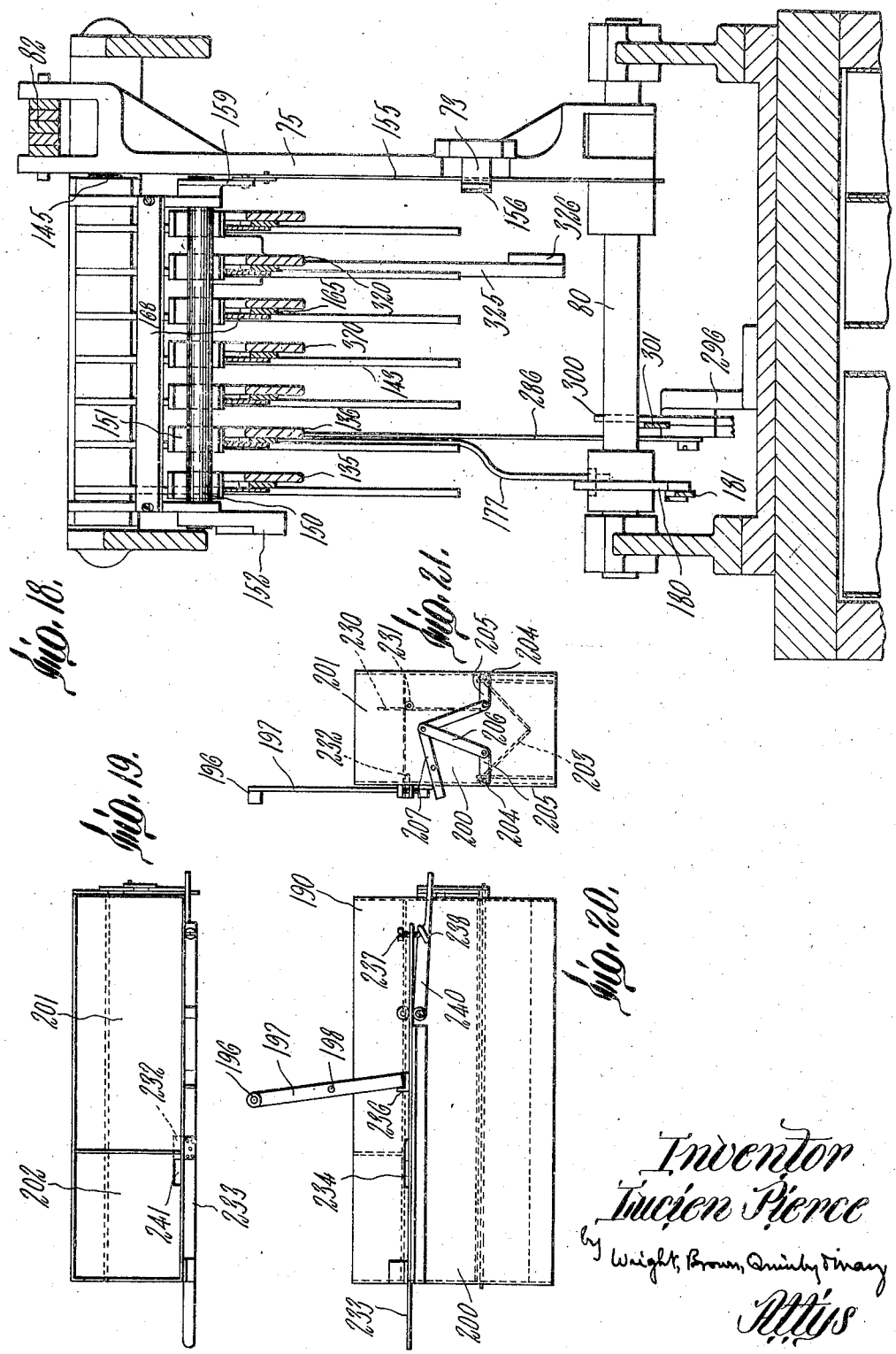

Patented Nov. 27, 1934

1,982,320

UNITED STATES PATENT OFFICE 1,982,320

CONTROL APPARATUS FOR WASHING AND CLEANSING MACHINES

Lucien Pierce, Malden, Mass., assignor of one-half to George W. Hooper, Salem, Mass., and one-half to Family Laundry Company Malden, Malden, Mass., a corporation of Massachusetts Application March 23, 1933, Serial No. 662,266

19 Claims. (Cl. 68—18)

This invention relates to apparatus for automatically controlling the several successive operations of a laundry machine incident to the washing and cleansing of a batch of clothes, etc. It is an object of the invention to provide a controlling apparatus which takes relatively little room, which is comparatively light in weight, economical to manufacture, positive in action, easy to adjust for varying the periods of successive steps, and which can be easily taken apart for repairs, the various parts being so arranged that most of the parts can be removed without disturbing the remaining parts of the mechanism. The embodiment of the invention hereinafter described and illustrated on the drawings is capable of easy and accurate adjustment to start and stop the various steps of operation of the washing cycle after accurately predetermined intervals. Various novel and advantageous constructional details are included in the invention which add to the efficiency of operation of the mechanism as a whole.

For a more complete understanding of the invention, reference may be had to the disclosure thereof in the following description and to the drawings of which,—

Figure 1 is a front elevation of a commercial laundry machine having attached thereto control mechanism embodying the invention.

Figure 2 is an end elevation of the same.

Figure 3 is a section on the line 3—3 of Figure 1.

Figure 4 is a front elevation of a timing cam drum, together with certain gears associated therewith.

Figure 5 is a sectional view of one of the ratchets and pawls illustrated in Figure 3.

Figure 6 is a front elevation of a modified form of gear transmission mechanism.

Figure 7 is an end elevation of the same.

Figure 8 is a plan view of the control mechanism as shown in Figure 1, some of the parts being left out to avoid confusion.

Figure 9 is a section on the line 9—9 of Figure 3.

Figure 10 is a section on the line 10—10 of Figure 1.

Figures 11 and 12 are fragmentary sectional views of details of the mechanism, showing two different positions of operation.

Figure 13 is a section on the line 13—13 of Figure 1.

Figure 14 is a fragmentary perspective view of a portion of the linkage for controlling the water shut-off.

Figure 15 is a section on the line 15—15 of Figure 8.

Figures 16 and 17 are fragmentary elevations, partly in section, of steam control mechanism.

Figure 18 is a section on the line 18—18 of Figure 10.

Figure 19 is a plan view of a container for soap flakes.

Figure 20 is a side elevation of the same.

Figure 21 is an end elevation of the same.

Referring to the drawings in detail, Figures 1 and 2 represent conventionally a standard washing machine of the type customarily used by laundries. Within the casing 50 is the customary horizontal cylinder which is rotated back and forth in a bath of water contained in the lower portion of the casing, the cylinder being driven by any suitable means such as a power belt 51 running on a pulley 52. The control mechanism embodying the invention may be mounted on a suitable frame 55 adjacent to one end of the casing 50. This mechanism may be driven by any suitable means. As shown, it is connected by a belt 56 from a pulley 57 mounted on the same shaft with the pulley 52 and extending from a pulley 57 to a pulley 58 mounted on a driven shaft 60 carried by the frame 55. As indicated in Figure 3, the driven shaft 60 is connected to a worm shaft 61 as by a pair of beveled gears 62, 63 which mesh with a beveled gear 64 mounted on the shaft 60. The miter gears 62 and 63 are loosely mounted on the shaft 61 and are operatively connected thereto by overrunning clutches, the details of which are not shown, so that no matter which direction the shaft 60 turns, the shaft 61 will be rotated in a single direction. Thus if the control apparatus is driven from the shaft of the washer as indicated in Figure 1, the shaft 61 is driven in a single direction regardless of the reversals of rotation of the washing machine. Mounted on the shaft 61 is a worm 68 which meshes with a worm gear 69 mounted on a shaft 70. This shaft carries a cam disk 71 having a cam slot 72 in a face thereof. A cam follower 73 rides in the slot 72 and actuates an arm 75 which rocks on a shaft 80. At the upper end of the arm 75 is a pin 81 on which are mounted a series of pawls 82 adapted to engage corresponding ratchet wheels 83. These pawls may be moved into and out of operation by cam elements 84 mounted on a shaft 85 (Figures 4 and 5). As shown in Figure 5, each cam element 84 has an elevated portion 86 which is adapted to hold its corresponding pawl 82 out of engagement with its respective ratchet wheel 83 when the cam element 84 is in suitable angular position. The ratchet wheels 83 have different numbers of ratchet teeth so that the speed of rotation of the shaft 90 (Figure 3) on which these ratchet wheels are mounted depends on which of the pawls 82 is operating on its respective ratchet wheel 83. The shaft 90 carries a pinion 91 which meshes with a gear wheel 92 mounted on the shaft 85. Thus the shaft 85 may be driven at different speeds according to its own angular position, since it carries also the cam members 84. Mounted on the shaft 85 is a drum 95 having a series of radial flanges 96 on which may be mounted timing lugs 100. These lugs may be adjustably fixed on the several flanges 96 to control the times of actuation of the various mechanisms for performing different operations in connection with the washing cycle. As shown in Figure 4, each lug may catch under an under-cut shoulder on the rim of a flange 96, its position being fixed by a set screw which bears on the rim. Thus the time intervals of the several washing steps in a cycle are determined by the location of the corresponding lugs 100 on the drum 95 and by the speed of rotation of the drum 95. As an entire washing cycle may extend over a period of more than an hour, the rotation of the drum 95 is necessarily slow. While it is possible to operate the drum at a constant speed of rotation, it is preferable to rotate the drum very slowly during the several washing steps when the control devices are inactive, and to speed up the rotation of the drum when any of the lugs 100 is about to trip a control device. Automatic changes of speed of rotation of the drum 95 may be obtained by transmission mechanism such as is illustrated in Figures 3, 4 and 5, and hereinbefore described, or by a modified form of transmission mechanism illustrated in Figures 6 and 7.

As hereinafter more fully described, the various devices for controlling the admission of water, steam, soap, etc. into the machine and for draining the machine from time to time, comprise a number of drop-arms which are normally held in an elevated position and are selectively released by corresponding lugs 100 on the timing drum 95. Cooperating with the drum is a constantly reciprocating member which serves to elevate to its normal position any arm which has been dropped by a lug 100. The reciprocating member may be in the form of a horizontal cylindrical drum 105 which, as shown in several of the figures including Figure 10, is eccentrically mounted on the shaft 70. As this shaft is constantly driven, the eccentric drum 105 rises and falls regularly. This reciprocatory movement of the drum 105 can be employed not only for the elevation of released drop-arms but also for actuating mechanism for driving the timing drum 95, as shown in Figures 6 and 7. To this end, a rock-arm is mounted to rock on the axis of the shaft 80, this arm being mounted below the eccentric drum 105 and being provided with a roller 107 which bears against the lower surface of the drum. A spring 110 pulls the arm 106 upwardly. Pivotally attached to the free end of the arm 106 is an upwardly extending rod 111 which is connected to a rock arm 112 loosely mounted on a shaft 115. The rock arm 112 carries a pawl 116 which engages the edge of a ratchet wheel 117 mounted on a shaft 115. As the arm 106 rises and falls, the rod 111 is moved up and down, reciprocating the pawl 116 on the ratchet wheel 117 so that the latter is rotated step by step. Mounted on the shaft 115 is a worm 118 which meshes with a worm gear 120 mounted on the shaft 85. The stroke of the arm 106 may be varied by means of a pin 125 which engages an arm 126. This arm is pivotally mounted as at 127, its angular position on its pivot being determined by any one of a number of pins 128 adjustably mounted on a disk 129 which in turn is mounted on a shaft 130. It is evident from Figure 7 that if the arm 126 is engaging a pin 128 which is set inwardly near the shaft 130, the arm 106 will have a long stroke as the roller 107 rides on the drum 105. If the arm 126 is in engagement with a pinion 128 which is set near the periphery of the disk 129, the pin 125 will engage the arm 126 so as to limit the upward movement of the arm 106. The angle of rotation of the ratchet wheel 117 for each revolution of the eccentric drum 105 will thus be considerably shortened, slowing the rate of the step by step rotation of the shaft 85, and hence of the timing drum 95.

Where the transmission mechanism illustrated in Figures 3, 4 and 5 is employed, the speed changes in the drive of the drum 95 are determined by the arrangement of the several cam elements 84 which can be adjusted as desired and which operate in accordance with the angular position of the drum 95. Where the modified transmission mechanism illustrated in Figures 6 and 7 is employed, the speed changes in the drive of the drum 95 depend on the step-by-step rotation of the shaft 130 which, as hereinafter described, is controlled by certain of the lugs 100 on the drum 95.

The chief function of the eccentric drum 105 is to cooperate with a series of drop arms, examples of which are illustrated in Figures 10, 13 and 15, for the operation of the various mechanisms for performing the different steps required in the operation of the washer as a whole. Referring to Figures 8 and 10, a pair of drop arms 135 and 136 are indicated, the arm 136 being shorter than the arm 135 and shown more clearly in Figure 8. Any desired number of additional drop arms may be similarly mounted to rock about the axis of a shaft 140 for controlling hot and cold water, steam and supplies, for stopping the machine at the end of a washing cycle, for actuating signals, or performing any other desired functions at predetermined times. Each of the drop arms is normally supported in its uppermost position, as shown in full lines in Figure 10 by a lug 141 located near its mid-point and engaging a shoulder 142 in a cam arm 143 rockably suspended from a shaft 145 above the lugs 141. The cam arms 143 are yieldingly pressed toward the right, as in Figure 10, by a cross bar 146 to which it attached a weighted arm 147 pivoted as at 148, this tending to hold the shoulders 142 under the respective lugs 141. For the dropping of individual drop arms, the respective cam arms 143 are swung to the left by suitable mechanism. A pin shaft 150, shown below and to the right of the shaft 145, is provided having a series of flat pins 151 loosely mounted in slots through the shaft 150. A weighted arm 152 is mounted on the shaft 150 and tends to rotate the shaft 150 in a counterclockwise direction, as shown in Figures 3 and 10. Referring to Figure 3, a rock arm 155 is loosely mounted on the shaft 80 for the actuation of the pin shaft 150, this rock arm having a cam follower 156 riding on the edge of the cam disk 71. This cam disk has an elevated portion 157 at its rim. When the cam follower 156 rides on this elevated portion, the arm 155 is swung toward the left, rocking the shaft 150 in a clockwise direction by means of a connecting link 158 attached to a radial arm 159 mounted on the shaft 150. Since the shaft 70 rotates constantly, the shaft 150 is rocked once for each revolution of the shaft 70.

Each drop arm is supplied with a slide member 165 loosely mounted on one side of the arm as by a pair of screws 166 and 167 extending through elongated slots in the slide 165, as illustrated, for example, in Figure 10. Thus the slide 165 is capable of a limited longitudinal movement with respect to the drop arm by which it is carried. At the left hand end of the slide 165 is an upstanding member 168 on the upper surface of which the lower end of one of the pins 151 rides. As the shaft 150 is rocked with each revolution of the eccentric drum shaft 70, the lower ends of the pins 151 ride back and forth on the upper surfaces of their respective members 168. As the drum 95 is slowly rotated step by step, one or another of the timing lugs 100 is eventually brought into contact with a tripping element 170 rockably mounted on the slide 165, each of the slides 165 having a similar trip element 170. The trip element 170 is provided with a nose 171 engageable by corresponding time lugs 100. As the nose 171 is engaged by a time lug 100 the further advance of the time lug moves the slide 165 toward the left so that eventually the rocking of the pin shaft 150 results in the lower end of the corresponding pin 151 riding off the edge of the element 168. This permits the pin 151 to fall so that its lower portion is alongside of the element 168. When the pin shaft 150 is then rocked back in a clockwise direction, the pin pushes the element 168 toward the left against the corresponding cam arm 143, the arm 143 thus being swung sufficiently to release the lug 141 from the shoulder 142. The corresponding drop arm thus is permitted to drop. The parts are so connected that this always occurs at the moment when the eccentric drum 105 is in its uppermost position, as indicated by a dotted circle in Figure 10. Thus when one of the drop arms is released, the surface of the eccentric drum 105 is immediately below a roller 175 carried by the arm so that the arm is thereupon supported by contact of the roller 175 with the drum 105. As the drum is constantly rotating about its eccentric axis, the drop arm is thereupon lowered gently as its roller 175 rides on the surface of the drum 105. The descent of the drop arm disengages the nose 171 from the timing lug 100 so that the slide 165 is at once retracted to the right as by a spring 176 which is attached at one end to the drop itself and at the other end to the lower portion of the pivoted trip member 170. As the eccentric drum 105 continues to complete its revolution, the drop arm rides upwardly again to its elevated position, and in doing so performs whatever act it is intended to perform in the control of the washing operations. When the drop arm is elevated by the drum 105, the lug 141 catches again on the shoulder 142 and the nose 171 rises to a position rearwardly of the lug 100 which has just tripped it. The nose is then ready to be tripped again by the next successive timing lug 100 on the corresponding flange 96 of the drum 95. As each of the several drop arms is lowered and raised in the same way and by similar instrumentalities this description will serve for all. The trip members 170 on the several drop arms are pivoted to yield by rocking in a clockwise direction if the drum 95 is manually rotated in the reverse direction to set it arbitrarily at any desired angular position, the pawls 82 being raised from their ratchet wheels when this is done. If the drive shown in Figure 6 is employed, the pawl 116 is held clear of its ratchet while the shaft 115 is manually rotated.

Connected to the free end of the drop arm 136 is a link 177 which in turn is connected to an arm 178 of a bell crank adapted to rock loosely on the shaft 80. Connected to the other arm 180 of the bell crank is a rod 181 on which is pivotally mounted a member 182 terminating in a catch 183, the weight of the member 182 being so distributed with reference to its pivot that the catch 183 is yieldingly maintained in a position in which it engages in succession a series of pins 185 arranged on a disk 186 which is mounted on the shaft 130. As shown in Figure 10, eight pins 185 are provided but any other desired number may be employed. Each time the drop arm 136 is lowered, the catch 183 is moved toward the right into the position shown in dotted lines, the next succeeding half revolution of the eccentric drum 105 raises the drop arm 136 and draws the catch 183 back to its former position, rotating the disk 186 and the shaft 130 through an eighth of a complete revolution. Mounted on the shaft 130 are several cam elements which perform various functions. For example, the disk 129 which carries the pins 128 (Figure 7) is mounted on the shaft 130 so that the step by step rotation of the shaft 130 controls the speed of drive of the timing drum 95 for each separate step in the washing cycle.

Also mounted on the shaft 130 are cams controlling the actuation of devices for introducing at one time or another the successive ingredients employed in the steps of the washing cycle. A series of any desired number of containers may be mounted on the frame 155 beneath the control mechanism, three such containers, 190, 191, and 192, being shown in Figure 1. These containers may be employed to hold charges of the various washing ingredients ready for introduction into the washer at the proper times. The container 190, for example, may be used for soap flakes or a mixture of soap flakes and soda ash. The containers 191 and 192 may be used for solutions of bleach and bluing. Additional containers may be supplied for other ingredients if desired.

A cam disk 195 is indicated in Figure 13 for controlling the supply of soap flakes from the container 190. A cam follower 196 rides on the cam edge of the disk 195, the roller 196 being mounted on the end of a lever 197 which is pivoted as at 198. The cam edge of the disk 195 has a low portion and a high portion connected by a number of steps corresponding to the number of charges of soap to be employed, three such steps being indicated in Figure 13. As the shaft 130 is rotated in a clockwise direction, the cam follower 196 is moved toward the left through three successive stages, swinging the lower portion of the lever 197 toward the right, when viewed as shown in Figure 13. This is equivalent to swinging the lower portion of the lever 197 to the left when viewed from the opposite direction as in Figure 20. The container 190 for soap flakes is illustrated in Figures 19, 20 and 21. This container comprises three compartments, a lower compartment 200, and two upper compartments 201 and 202. The bottom of the lower compartment 200 is defined by a pair of plates 203 which are mounted on shafts 204. Also mounted on these shafts are arms 205 which are connected by link members 206 to a rocking lever 207. When the rocking lever 207 is in the position illustrated in Figure 21, the arms 205 are maintained in the horizontal position and the lower edges of the floor members 203 are held together as indicated, to form a hopper-shaped bottom for the chamber 200. When the rocking lever 207 is released, the floor members 203 are permitted to swing downwardly to a vertical position, the soap in the chamber 200 thereupon dropping onto a pair of conveyor belts 210, 211 as shown in Figure 2. These conveyors may be driven by any convenient means as, for example, a pair of gear wheels 213 and 214, the shaft of the latter being provided with a sprocket wheel 215 (Figure 1) on which is a chain 216 passing around a sprocket wheel 217 mounted on the shaft 70. The conveyors 210 and 211 move toward each other so that the soap which drops onto these conveyors from the box 190 is dumped into a trough 220 which is connected by a channel 221 with a manifold 222 extending lengthwise of the washing machine housing 50 and opening thereinto through a series of suitable slots 223 (Figure 1).

Referring again to Figures 19, 20 and 21, each of the compartments 201, 202 is provided with a floor member 230 which is rockable on a shaft 231 offset from the longitudinal median of the box. These floors are held in horizontal position by a lug 232 which is mounted on a horizontal rod 233 and projects through a slot 234 in the side of the box just below the level of the floors 230. The rod 233 is provided with an upstanding ear 236 which is engaged by the lower end of the rocking lever 197 so that when the lower portion of this lever is moved toward the left as in Figure 20 the rod 233 is also moved through three successive steps toward the left. The first step causes a set screw 237 on the rod 233 to ride clear of a lug 238 on a lever 240, the end portion of which engages the rocking arm 207 to hold the floor members 203 of the compartment 200 in their closed position. Thus the first movement of the rod 233 toward the left releases the lever 207 and permits the floor members 203 to swing apart and dump the soap in the compartment 200 onto the conveyor belts for delivery into the washing machine. The next movement of the rod 233 moves the lug 232 clear of the corner of the floor of the chamber 201, permitting this floor to swing by gravity to the position shown in Figure 21. The final movement of the rod 233 moves the lug 232 into registry with a slot 241 so that the floor of the chamber 202 is permitted to swing to a vertical position and dump the soap in this chamber on the conveyor belts.

Mounted on the shaft 130 is a cam disk 245 (Figure 15) for rocking a rock arm 246 to one end of which is attached a rod 247 adapted to raise a valve 250 in the bottom of the container 191 so as to release the liquid ingredient therein at the proper time, the other end of the arm 246 being pivoted on a shaft 248. A similar cam member 251 (Figure 3) is mounted on the shaft 130 to rock an arm 252 so as to raise the rod 253 to open a valve 254 in the bottom of the container 192. Thus the soap and other ingredients are introduced into the washing machine at the proper moments in response to step-by-step rotation of the supply cam shaft 130 as the drop arm 136 is lowered and raised from time to time as controlled by the corresponding timing lugs 100 on the drum 95.

As shown in Figure 2, the water for the washing steps is introduced in the washing machine through supply pipes 260, one for hot water and the other for cold water, these pipes being connected to a pair of valves 261 each of which is opened by raising a lever arm 265 connected with the stem of the corresponding valve. Each lever arm 265 is connected with a vertical rod 266 by which it is raised to open valve position. The water valves 261 discharge into a common pipe 270 which terminates in a nozzle 271 within the duct 221. A small branch pipe 272 may lead off from the discharge pipe 270 to the trough 220 so as to wash the ingredients which fall into the trough 220 down into the duct 221 for delivery into the washing machine. As a result of this construction the ingredients become thoroughly mixed with the wash water as it emerges from the nozzle 271, and are commingled therewith when they enter the casing. This provides a uniform initial distribution of the washing ingredients throughout the length of the washing machine.

Mechanism by which the lever arms 265 are operated at predetermined times is illustrated in Figures 8 and 10. As therein shown the drop arm 135 is provided with a forked end 275 carrying a transverse pin 276 which extends through and rides in an elongated slot 277 in the rod 266. A plate 280 is pivotally mounted on the pin 276 and is provided with a laterally projecting lug 281 adapted to catch under a projection 282 on the edge of the rod 266. The plate 280 also carries a trip arm 283 which is arranged to engage the under face of a horizontal bar 284 carried by a bracket 285 secured to a vertical rod 286. When the arm 135 is released from its upper position as shown in Figure 10 and is allowed to drop, it moves down to the dotted position shown in Figure 10 and is then raised by the next half-revolution of the eccentric drum 105 to its upper position. As it rises, the weight of the plate 280 holds the lug 281 against the edge of the vertical rod 266 so that the lug catches on the projection 282 and elevates the rod 266, rocking the shaft 265 so as to open one of the water valves 261. Thus the valve is held open until the bar 284 is lowered by suitable mechanism so as to bear down on the trip arm 283 and swing the plate 280 out sufficiently to release the lug 281 from the projection 282, and thus to allow the rod 266 and lever 265 to drop. This closes both water valves, as indicated in Figure 8. Since the operating mechanism for the two valves is the same, a description of one will serve for the other. The water valves are closed by mechanism responsive to the level of the pool within the washing machine. To this end a vertical float tank 290 is mounted adjacent to the end wall of the washing machine and communicates therewith as by a suitable pipe or opening 291. Within the float tank 290 is a float 292 attached to a rod 293 which is connected to the end of a lever 294. The vertical rod 286 is connected to the opposite end of the lever 294 as indicated in Figures 2, 10, 13 and 14. A bell crank 295 is pivotally mounted on a bracket 296 (Figures 10 and 13), the long arm of this bell crank being pivotally attached as at 297 to the lever 294 (Figure 14), a collar 298 being provided to limit the relative rocking of these members. The bell crank has a short arm 300 to which is attached a rod 301 extending forwardly, the forward end of the rod being slidably supported as by a pin 302 riding in a slot 303 in the rod. The forward end of the rod 301 is adapted to engage one of a number of stop pins 305 adjustably mounted in the disk 306 which is mounted on the shaft 130. As the float 292 rises with the surface of the pool in the washing machine, the lever 294 is gradually swung upwardly, carrying with it the long arm of the bell crank 295 and rocking the bell crank on its fulcrum so that the rod 150

301 is moved forwardly until it encounters one of the stop pins 305. When this happens, further rocking of the bell crank 295 is stopped. As the float continues to rise, the lever 294 thereupon is forced to rock on the pin 297. This draws the trip arm 283 forwardly, causing the plate 280 to swing outwardly so that the lug 281 is released and the water valves are allowed to close. It is evident from Figure 13 that the height of the water level for the various washing and rinsing steps may be easily regulated by the location of the several stop pins 305. If, for example, a relatively small amount of water is desired for a washing step, the corresponding pin 305 is set near the periphery of the disk 306 so that it is soon engaged by the advancing end of the rod 301, whereupon the water valves are tripped and the supply of water to the washing machine is shut off. If a pin 305 is set near the axis of the disk 306, the rod 301 must travel further in order to engage it, thus allowing the float to rise so much further before the water supply is shut off.

In addition to enough lugs 100 on the drum 95 to open the water valves at the beginning of each washing or rinsing step, additional lugs may be provided to open the water valves a short time after sufficient time has elapsed for the desired amount of water to enter the machine. Thus, if after the desired level has been reached and the water valves have been shut off the level of the pool is lowered by absorption of water into the clothes, the additional operation of the water valves restores the pool to the desired level. The valve-closing mechanism always closes the valves at once when the water in the machine is up to the desired level.

Mechanism for automatically controlling the temperature of the various charges of water in the washing machine is illustrated in Figures 2, 8 and 15. A steam supply pipe 310 leads into the lower portion of the washing machine and is supplied with an on-and-off valve 311 and a second valve 312 controlled by a thermostat 313. The valve 311 is usually held open during the various washing steps but is closed between washing steps when the successive pools are being discharged through the dump valve. To this end a drop arm 320 is provided with a forked end 321 carrying a pin 322 which extends through an elongated slot 323 in a vertical rod 325, the lower end of this rod being connected to a lever arm 326 pivoted as at 327 (Figure 2), the valve stem 328 of the steam valve 311 being attached to the lever 326. The arm 326 is raised to open the steam valve and lowered to close it. To this end the slotted rod 325 is provided with a pair of fins 331, 332 projecting from one side face thereof. A square cam member 333 is adapted to slide vertically between these fins if turned to fit between them as shown in Figure 16. If this cam is turned 45° as shown in Figure 17, it catches on the lower ends of the fins and will not enter the channel between them. The cam element 333 is mounted on the pin 322 which rides in the slot 323, a ratchet wheel 335 with eight teeth being mounted on this pin on the opposite side of the rod 325. For the rotation of the cam member 333, a pawl 336 is pivotally mounted as at 337 on an ear 338 projecting from the rod 325, the pawl 336 having a weighted portion 340 arranged to press it toward the ratchet wheel 335. As the ratchet wheel 335 descends with the drop arm 320, it moves downwardly past the pawl 336, being held against rotation during such movement by a pawl 341 mounted on the arm 320. When the arm 320 is thereupon raised again, the upward movement of the ratchet wheel 335 brings one of the teeth into contact with the lower edge of the pawl 336, causing the ratchet wheel to rotate through an angle of 45°. This also turned the cam member 333 through a similar angle so that it alternately assumes the position illustrated in Figures 16 and 17. When the cam member 333 is turned to the position shown in Figure 16 during the rising motion of the arm 320, the cam member enters the channel between the fins 331 and 332 and is held in its lowermost position when the drop arm 320 is swung to its upper position. When the drop arm 320 is next dropped and then starts its upward movement, the cam member 333 is turned to the position shown in Figure 17, in which position it cannot enter the channel between the fins 331 and 332. Hence, as the arm 320 continues its upward movement, it carries with it the rod 325, thus swinging the lever 326 to its upper position and elevating the stem 328 of the steam valve 311. Each down and up movement of the arm 320 thus results in the opening or the closing of the steam valve. When the steam valve 311 has been opened, it is thereupon controlled by the thermostat 313 until the valve 311 is closed prior to the conclusion of the current step in the washing cycle.

At the conclusion of each washing step, the pool of water within the machine is automatically dumped through a valve 350. This valve may be connected by a suitable link 351 (Figure 2), which in turn is connected to the end of a lever arm 352 pivotally mounted as at 353. This lever arm carries a cam follower 354 which rides in a cam slot 355 in a cam disk 360 rotatably mounted as at 361 on a bracket 362. Mounted on this cam disk is a ratchet wheel 363 having four teeth successively engageable by a pawl 364 mounted on a bell crank 365 which rocks on the pivot 361 and is attached to an operating rod 366. As shown in Figure 8, the rod 366 is connected to the end of a drop arm 370 which is periodically lowered and raised in the usual manner. Each actuation of the drop arm rocks the bell crank 365, advancing the cam disk 360 through an angle of 90°. This results in the rocking of the lever 352 from one extreme position to the other, each position corresponding to the open or closed position of the dump valve 350. Thus the actuations of the drop arm 370 alternately open and close the dump valve.

It is to be understood that the foregoing description of certain embodiments of the invention are by way of illustration and not limitation, and that various modifications and changes may be made in the described structure without departing from the spirit or scope of the invention as defined in the appended claims.

I claim:

1. Apparatus of the class described, comprising a series of drop-arms each pivotally mounted at one end, supporting means for the several arms spaced from the pivoted ends thereof, means for selectively disengaging said supporting means to release the arms severally at predetermined times, and means synchronized with said disengaging means for lowering released arms and then raising said arms for re-engagement by said supporting means.

2. Apparatus of the class described, comprising a series of drop-arms each pivotally mounted at one end, supporting means for the several arms spaced from the pivoted ends thereof, means for selectively disengaging said supporting means to release the arms severally at predetermined times, said disengaging means including a constantly reciprocating element for each arm, a member carried by each said arm and movable thereon to disengage the supporting means for said arm, and means for moving said member into operative engagement with said element for actuation by said element to release the supporting means for the corresponding arm.

3. Apparatus of the class described, comprising a series of drop-arms, each pivotally mounted at one end, supporting means for the several arms spaced from the pivoted ends thereof, a drum below said arms constantly revolving on an eccentric horizontal axis, the side face of the drum engaging said arms when the central axis of the drum is directly above its axis of rotation, and means for selectively releasing the supporting means for the several arms, said releasing means including a constantly reciprocating element for each arm, a member carried by each arm and movable thereon into position to be operatively engaged by one of said reciprocating elements, said member being further movable by its reciprocating element to release the corresponding arm-supporting means, the reciprocating elements and drum being synchronized so that the elements complete a stroke in the support-releasing direction each time the central axis of the drum is at its maximum height above the axis of rotation of the drum.

4. Apparatus of the class described, comprising a drop-arm pivotally mounted at one end, a support means for said arm spaced from said pivoted end, and means for releasing said support from operative engagement with said arm, said releasing means including a member longitudinally slidable on said arm from a normal position to engage and release said support, a rock-shaft above said arm, a pin transversely slidable through said shaft and rockable thereby, said pin being arranged so that its lower end engages and rides on a portion of said slidable member, a shoulder on said slidable member adjacent to said pin, and timing means for imparting preliminary movement to said slidable member at predetermined times to permit said pin to engage said shoulder and impart support-releasing movement to said slidable member.

5. Apparatus of the class described, comprising a drop-arm pivotally mounted at one end, a support means for said arm spaced from the pivoted end thereof, a member constantly oscillating up and down under said arm and positioned to receive and lower said arm when released and to raise said arm again for re-engagement with said support means, a reciprocating element, and timing mechanism cooperating with said reciprocating element at predetermined times to release said support means, said oscillating member being synchronized with said reciprocating element so that releasing movement of said support means takes place only when said oscillating member is in position to receive said arm for lowering movement.

6. Apparatus of the class described, comprising a drop-arm pivotally mounted at one end, support means for said arm spaced from said pivoted end and operable to release said arm, oscillating means for lowering said arm when released and for raising said arm for re-engagement with said support means, means including a slow-motion timing drum for releasing said arm at predetermined times, common driving means for said oscillating means and releasing means, and means for automatically changing the rate of rotation of said timing drum at various stages of its revolution.

7. Apparatus of the class described, comprising a drop arm pivotally mounted at one end thereof, support means for said arm spaced from said pivoted end and operable to release the arm, oscillating means for lowering said arm when released and for raising said arm for re-engagement with said support means, means for operating said support means at predetermined times to release said arm, said operating means including a slow-motion timing device, driving means for said oscillating means and timing device, speed-reduction power-transmitting means operatively connecting said driving means and said timing device, and speed control means actuable by rising motion of said arm to change the speed ratio between said driving means and said timing device.

8. Mechanism for supplying washing ingredients to a washing machine casing, comprising a plurality of containers each adapted to hold a charge of a washing ingredient, means for releasing each of said ingredients from its container for entry into the washing machine, cams for controlling said releasing means, a cam shaft carrying said cams, means actuable to direct a stream of liquid into said machine to form a pool therein, a float communicating with the liquid in the casing and movable in response to change of liquid level therein, means actuable by movement of said float to a predetermined level for cutting off the supply of said liquid to the machine, a control device for the last mentioned means including a member movable therewith and adapted to render the motion of the float effective to actuate said last mentioned means when the movement of said member is stopped, a series of adjustable stop elements mounted on said cam shaft for and successively presentable to said member by rotation of said shaft, and means for automatically imparting step-by-step rotation to said shaft at predetermined times.

9. Mechanism for supplying washing ingredients to a washing machine, comprising a plurality of containers each adapted to hold a charge of a washing ingredient, means for releasing each of said ingredients from its container for entry into the machine, cams for controlling said releasing means, a cam-shaft carrying said cams, means including a timing drum for imparting step-by-step rotation to said cam shaft at predetermined times, driving means for said timing drum, variable speed power-transmitting means operatively connecting said drum and its driving means, and adjustable speed-controlling means on said cam-shaft adapted to cooperate with said power-transmitting means to vary the speed of rotation of said drum in accordance with various angular positions of said shaft.

10. Control mechanism for a washing machine having a water valve, a steam valve, and a dump valve, comprising mechanisms actuable to operate each of said valves, and power means for actuating the several said mechanisms, said power means including a series of drop-arms pivotally mounted at one end and attached to one of said mechanisms at the other end, constantly oscillating, power-driven means beneath said arms for lowering and raising any arm when released, means normally supporting each arm out of contact with said oscillating means, and means for selectively releasing the support means for the several arms at predetermined times whereby the released arm is lowered and positively raised again by said oscillating member to operate the mechanism attached to the arm.

11. Apparatus for controlling the supply of washing ingredients from separate containers to a washing machine, comprising means actuable to release said ingredients severally and selectively for entry into said machine, cam means for actuating the several releasing means in a predetermined sequence, a common cam-shaft for said cam means, means for controlling the rotation of said cam-shaft including a pivotally mounted drop-arm, means for releasing said drop-arm at predetermined times, means for lowering and raising said arm when released, and means responsive to a lowering and raising of said arm to effect step-by-step rotation of said cam-shaft.

12. Apparatus for controlling the admission of water and washing ingredients into a washing machine, comprising a plurality of drop-arms each pivotally mounted at one end and normally supported in raised position, means for supporting each said drop-arm in its normal position, means for releasing said arms severally at predetermined times including a timing drum having adjustable lugs thereon alined with one or another of said drop-arms, an oscillating member adapted to receive and lower any drop-arm when released and to raise the lowered drop-arm back to normal position, means for driving said releasing means and oscillating member in synchronism, a cam-shaft, a series of cams on said shaft for the operation of releasing means for washing ingredients, means including one of said drop-arms for imparting step-by-step rotation to said shaft by rising movements of said drop-arm, means operable by rising movement of another of said drop-arms to open a water valve, means for closing said water valve automatically when the water in the machine reaches a predetermined level, and means carried by said cam-shaft for determining different water levels according to the angular position of the cam shaft.

13. Apparatus of the class described, comprising a plurality of drop-arms each pivoted near an end thereof, means for supporting said arms in normal raised position, a timing drum, means including lugs on said drum and constantly reciprocating elements for selectively releasing said drop-arms at predetermined times, constantly oscillating means for lowering and raising again any of said drop-arms when released, common means for driving said drum, reciprocating elements and oscillating member in synchronism whereby said oscillating member is in position to lower any drop-arm when released, a camshaft, means including one of said drop-arms for imparting step-by-step rotation to said shaft, and means responsive to rotation of said shaft to vary the speed of operation of said common driving means.

14. Apparatus of the class described, comprising a plurality of drop-arms each pivoted near an end thereof, means for supporting said arms in normal raised position, means for releasing said arms selectively at predetermined times, means including a drum revolving on an eccentric axis for lowering and then raising any of said drop-arms when released, a cam-shaft, means including one of said drop-arms for imparting step-by-step rotation to said cam-shaft, water-control mechanism operable by one of said drop-arms, and means including stop elements variably disposed about said cam-shaft for variably limiting the extent of operation of said water-control means in accordance with the angular position of said cam-shaft.

15. Apparatus of the class described, comprising a drop-arm pivotally mounted at one end, support means for said arm spaced from said pivoted end and operable to release said arm, oscillating means for lowering said arm when released and for raising said arm for re-engagement with said support means, means including a slow-motion timing drum for releasing said arm at predetermined times, and common driving means for said oscillating means and releasing means.

16. Apparatus of the class described, comprising a series of drop-arms each pivotally mounted at one end, supporting means for each said arm spaced from the pivoted end thereof, means for releasing said arms severally at predetermined times, and means synchronized with said releasing means for lowering said released arms and then positively raising the lowered arms for re-engagement with the corresponding supporting means.

17. Apparatus of the class described, comprising a series of drop-arms each pivotally mounted at one end, means for normally maintaining said drop arms in an elevated position, operating means for lowering and raising said arms severally from and back to said normal elevated position, and timing means controlling the operation of said operating means.

18. Apparatus of the class described, comprising a series of drop-arms each pivotally mounted at one end, means for normally maintaining said drop arms in an elevated position, operating means for lowering and raising said arms severally and selectively, said operating means including a constantly driven rising and falling member beneath said arms, means controlling the operation of said operating means, said controlling means including a timing drum with adjustable lugs thereon, and common means for driving said member and said drum.

19. Apparatus of the class described, comprising a series of drop-arms each pivotally mounted at one end and normally maintained in an elevated position, a drum constantly rotatable on an eccentric horizontal axis beneath said arms, said drum engaging all said arms when in its uppermost position, and means including a timing drum for releasing said arms severally and selectively at predetermined times, said means being synchronized with said drum so that said means operates to release an arm only when the drum is in its uppermost position.

LUCIEN PIERCE.